United States Patent [19]

Jacyno

[11] 4,024,888

[45] May 24, 1977

[54] EVAPORATOR PRESSURE REGULATOR

[75] Inventor: Henry Jacyno, Franklin, Wis.

[73] Assignee: The Singer Company, New York, N.Y.

[22] Filed: Feb. 2, 1976

[21] Appl. No.: 654,465

Related U.S. Application Data

[63] Continuation of Ser. No. 519,853, Nov. 1, 1974, abandoned.

[52] U.S. Cl. .............................................. 137/514
[51] Int. Cl.² ...................................... F16K 21/06
[58] Field of Search ............... 62/217, 225, 236; 137/489.3, 491, 494, 497, 510, 514, 529, 625.28, 625.33; 251/61.2

[56] References Cited

UNITED STATES PATENTS

| | | | |
|---|---|---|---|
| 3,208,224 | 9/1965 | Hoekstra | 137/514 |
| 3,219,063 | 11/1965 | Schumann et al. | 137/625.33 |
| 3,414,009 | 12/1968 | Merchant | 137/494 |
| 3,614,966 | 10/1971 | Orth | 137/489.3 |
| 3,667,247 | 6/1972 | Proctor | 62/225 |
| 3,822,563 | 7/1974 | Orth | 62/217 |

FOREIGN PATENTS OR APPLICATIONS

| | | | |
|---|---|---|---|
| 920,771 | 10/1954 | Germany | 137/529 |
| 896,847 | 5/1962 | United Kingdom | 137/529 |

*Primary Examiner*—Martin P. Schwadron
*Assistant Examiner*—G. L. Walton
*Attorney, Agent, or Firm*—Michael, Best & Friedrich

[57] ABSTRACT

Pressure acting on the face of the poppet valve is opposed by a gas charge or a spring in the bellows. The valve controls evaporator pressure in an automotive air conditioning system. Destructive response to pressure pulses from the compressor is prevented by the static friction obtained by having a leaf spring bear on opposed sides of a self-lubricating plastic sleeve carried on a shaft fixed on the valve. The various modifications show ways of minimizing the effect of temperature change through the valve and minimizing the differential of the valve.

9 Claims, 8 Drawing Figures

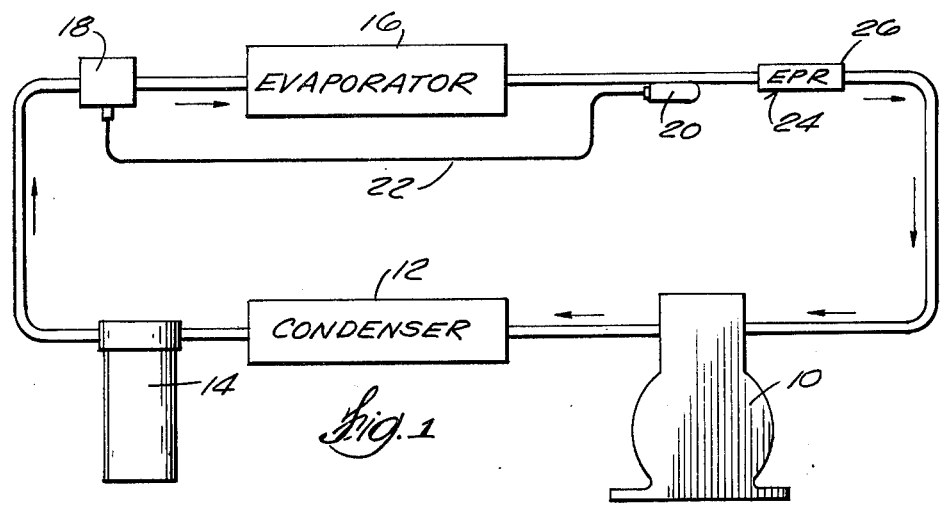
Fig. 1
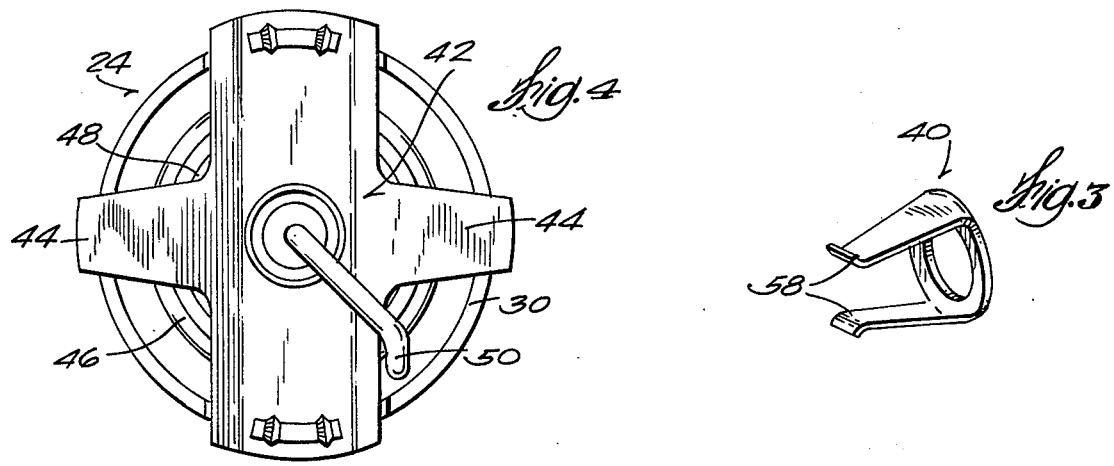
Fig. 4
Fig. 3
Fig. 2

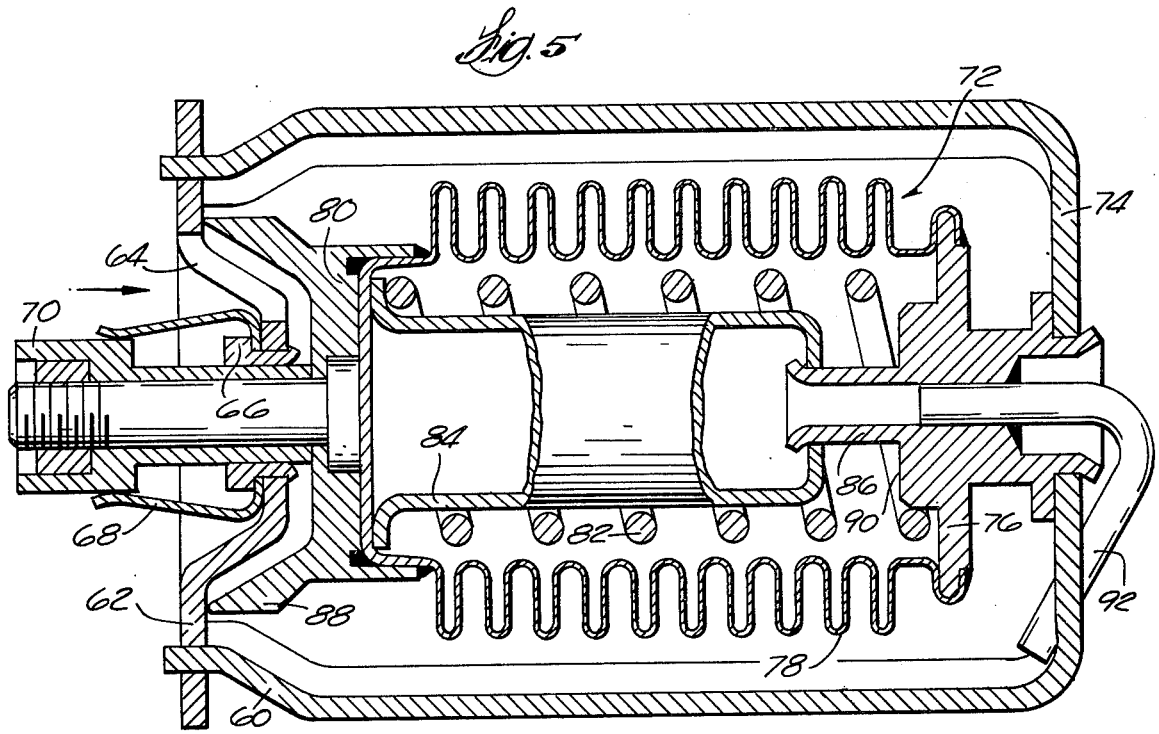
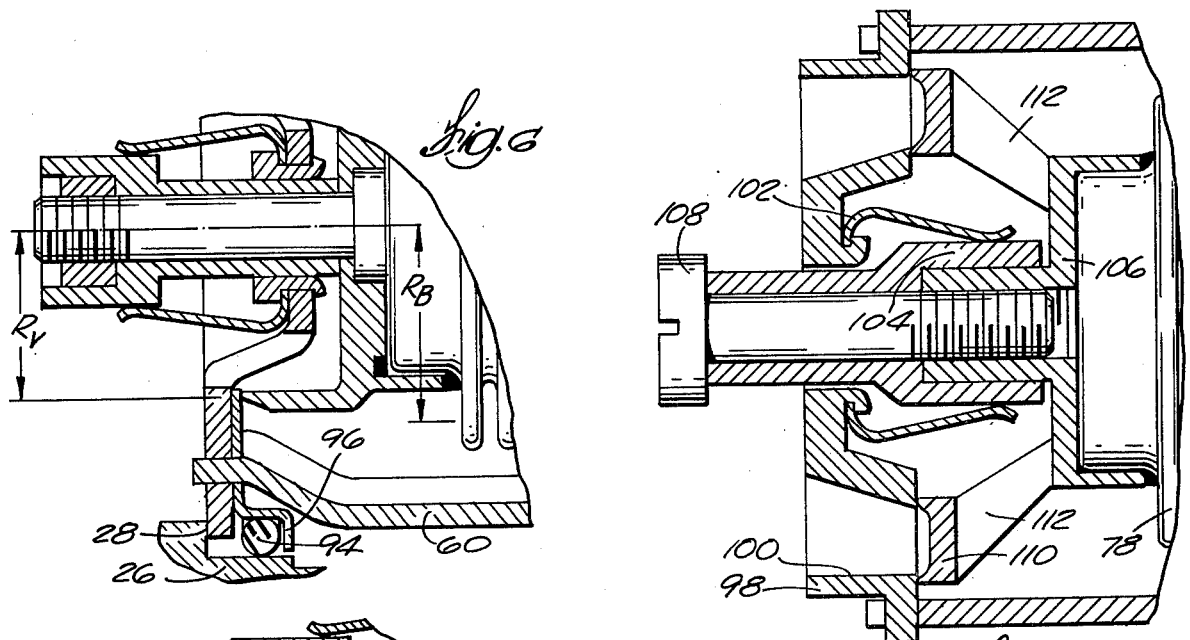
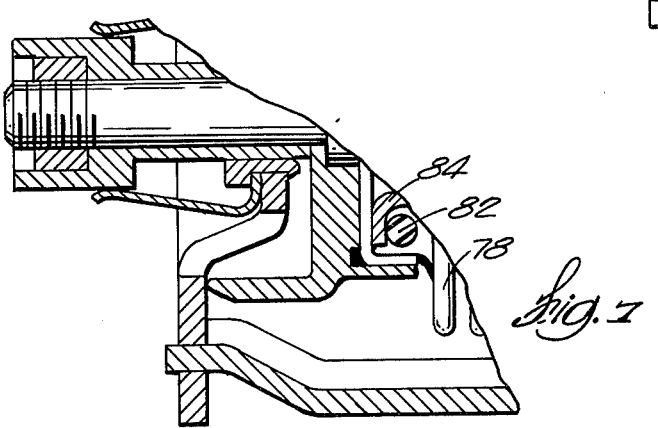

EVAPORATOR PRESSURE REGULATOR

This is a continuation of application Ser. No. 519,853, filed Nov. 1, 1974, now abandoned.

BACKGROUND OF THE INVENTION

In automotive air conditioning systems it is desirable to control the evaporator pressure (temperature) to prevent freezing condensed moisture on the evaporator which blocks air flow. The present controls for this purpose are complex and subject to malfunction if contaminated by dirt or moisture entrained in the refrigerant. The present controls do not fail safe. Thus failure may lead to failure of other system components. The temperature change in refrigerant flowing through the valve in flooded systems can increase the evaporator pressure differential depending upon the cooling load.

SUMMARY OF THE INVENTION

This valve provides simple, low cost evaporator pressure regulation. The valve fails safe and is not affected by dirt or moisture in the system. The valve is not affected by pressure pulsations set up by the compressor piston downstream of the valve. Provision is made to minimize temperature effects in a flooded evaporator system and keep the valve differential low.

DESCRIPTION OF THE DRAWINGS

FIG. 1 is a schematic representation of an air conditioning system showing a location for the present valve.

FIG. 2 shows the valve in vertical section mounted in the adapter fitting or housing.

FIG. 3 is an enlarged perspective of the spring which develops the static friction to damp response to pressure pulsations.

FIG. 4 is a detailed end view showing the end plate.

FIG. 5 is a vertical section showing a modified valve in which the bellows is loaded by a spring (instead of a gas charge) to minimize temperature effects on the bellows.

FIG. 6 is a fragmentary section through a modification in which temperature effects on the gas-charged bellows are compensated by giving the bellows an effective area greater than the poppet valve.

FIG. 7 is a fragmentary sectional view combining the salient features of FIGS. 5 and 6.

FIG. 8 is a fragmentary sectional view in which the valve orifice area is increased for the same length stroke.

DESCRIPTION OF THE PREFERRED EMBODIMENT

In the illustrated automotive air conditioning system the compressor 10 delivers hot compressed refrigerant to the condenser 12 where it is cooled and becomes a liquid. Refrigerant then flows through a drier-receiver 14 and then is supplied to the evaporator under control of thermostatic expansion valve (TXV) 18 in accordance with temperature conditions at the evaporator outlet as sensed by the usual TXV feeler bulb 20 connected to the TXV by capillary tube 22. Under excess capacity conditions the TXV cannot control the flow adequately and it becomes desirable to control the evaporator pressure/temperature (they are related) to prevent icing the evaporator. In this system the evaporator pressure regulator valve (EPR) 24 is mounted in the return line to the compressor. It could be mounted in the compressor housing.

The EPR valve 24 includes a housing 26 having an internal shoulder 28 providing a seat for the yoke 30. The yoke includes a circular end portion 32 which functions as a seat for poppet valve 34, is apertured to provide the valve orifice, and has webs 36 supporting bushing 38. The bushing 38 is staked to the central portion with spring 40 retained by the bushing. The diametrically opposed arms of the yoke are staked to end plate 42 which is generally in the form of a cross. Two opposed arms 44 of the end plate are formed to bear against ring 45 threaded into the housing 26 to load arms 44 to retain the valve assembly firmly against seat 28 inside the housing.

The valve is operated by a gas-charged bellows 46 soldered to end cap 48 staked to end plate 42 with the capillary charging tube 50 ending through the end plate. After charging the bellows, the tube is pinched, sealed and bent over as illustrated. The bellows is soldered to cap 48 at one end and to valve 34 at the other end. The mean effective area of the bellows is equal to the area of the valve orifice. Therefore, in an air conditioning system in which the refrigerant passing the EPR is gaseous, the pressure on the bellows side of the valve (the downstream pressure) does not affect valve operation.

The valve 34 is provided with a shaft 51. Plastic (self-lubricating) sleeve 52 is mounted on the shaft with the sleeve end abutting the valve. Nut 54 is threaded on shaft 51 inside the enlarged head 56 of the sleeve to retain the sleeve. The spring arms 58 bear against the head 56 with sufficient force to develop static friction resisting valve movement enough to damp response to pressure pulsations set up by the compressor. Since the spring acts on opposed portions of the sleeve, the load is balanced and the shaft does not tend to misalign in the bushing. Once the valve starts moving, the friction is reduced. It will be noted the shaft passing through the bushing guides the valve movement.

The gas charge in the bellows holds the valve closed. As the pressure against the valve exceeds the force of the gas charge, the valve starts to open. Maximum opening is determined by the shoulder 59 coming into contact with bushing 38. Without the damping obtained by the spring acting on the sleeve the bellows will respond to pressure pulsations and will fail in a short time. Should the bellows fail, the gas charge leaks out and the valve fails in the open position, thus insuring flow to the compressor and preventing damage. Any small leakage past the valve (when closed) or between end 32 and shoulder 28 will be quite small and is acceptable in that it lubricates and cools the compressor.

If the automotive air conditioning system is the flooded type in which most of the refrigerant leaving the evaporator is liquid, the refrigerant will expand as it flows through the EPR when the EPR is throttling flow. The expansion will cool the bellows and lower the pressure (force) of the gas charge inside the bellows and will cause a reduction in the evaporator pressure. This is not desirable and the modifications of FIGS. 5–8 overcome this effect.

In FIG. 5 the yoke 60 is staked to plate 62 which has webs 64 between the valve orifices. The central portion of plate 62 supports bushing 66 and spring 68 which bears on the friction member 70 as in FIG. 2. The bellows assembly 72 is supported by the right end 74 of the yoke 60 with the end cap 76 staked to end 74. The bellows 78 is soldered to the end cap 76 and to the valve end cap 80 with a compressed spring 82 captured therebetween. Sleeve 84 supports (centers) the spring and is guided on spud 86. Opening of valve 88 is limited by contact of sleeve 84 with shoulder 90 on the end cap 76. The capillary tube 92 is used to evacuate the bellows or to put in a low gas charge. With the arrangement of FIG. 5 the evaporator pressure acting on the poppet valve is opposed by spring 82 and cooling of the bellows will have no effect.

In FIG. 6 no spring is used — a gas charge is used as in FIG. 2 but the area of the poppet valve is less than the effective area of the bellows. This is illustrated by showing the difference in effective radius of the valve ($R_V$) and the bellows ($R_B$). This works generally like FIG. 2 but in a flooded system, expansion of the refrigerant through the partially closed valve causes the pressure (temperature) outside the bellows to drop as the pressure (temperature) inside the bellows drops. Since the bellows area is larger in relation to the valve area (of FIG. 2 in which they are the same) the reduction in closing force is compensated and the valve differential is maintained within a narrower range.

FIG. 6 also illustrates an O-ring seal at 94 retained by retainer 96 staked to the yoke 60. This can be used in any of the modifications where the system requires a static seal at the periphery of the valve.

FIG. 7 illustrates what might be termed a combination of FIGS. 5 and 6 in that the spring 82 (instead of a gas charge) is used inside bellows 78 which has a larger area than the valve. Now the bellows is relatively unaffected by temperature while a high downstream pressure (around the bellows) helps keep the valve open and a reduced pressure helps close the valve. This arrangement holds a very narrow differential on the evaporator pressure and is superior to either the form of FIG. 5 or FIG. 6 alone.

The differential of the evaporator pressure can be reduced even more making the valve more sensitive to pressure change. Thus in FIG. 8 the yoke 60 is staked to an end cap 98 which provides an annular orifice 100 and carries the damping spring 102 acting on the sleeve 104 fixed on the bellows cap 106 by screw 108. The poppet valve 110 carried by webs 112 is fixed on cap 106. When the valve opens, flow can go inside and outside of the poppet ring 110 — thus increasing flow for the same stroke of the bellows. This valve area exposed to downstream pressure remains the same. This construction can be used in combination with any of FIGS. 5, 6, and 7 to improve performance.

I claim:

1. A pressure regulating valve including a housing having an inlet and an outlet, a valve seat in the housing between the inlet and the outlet and having a valve orifice inside the seat, a bushing fixed on the centerline of the seat on the inlet side of the seat, a poppet valve located on the outlet side of the seat with its face exposed to the inlet pressure and cooperating with the seat to regulate flow, a sealed bellows located on the outlet side of the seat and having one end fixed relative to said seat and the other end connected to said valve, means in said bellows holding the valve on the seat until the force of the inlet pressure acting on the valve face exceeds the force of said means, a shaft projecting from the valve face through the bushing, a self-lubricating sleeve on the shaft extension, a spring having spring arms acting on opposed sides of the sleeve and imposing greater resistance to valve movement from a static condition than the resistance to continuous movement to thereby damp movement of the valve in response to pressure pulsations acting on the bellows.

2. A pressure regulating valve according to claim 1 in which the mean effective area of the bellows is substantially equal to the effective area of the valve orifice and said means is a gas charge inside the bellows.

3. A pressure regulating valve according to claim 2 in which said one end of the bellows is connected to an end plate and said seat is connected to the end plate by arms extending from the seat to the end plate.

4. A pressure regulating valve according to claim 3 mounted in a tubular housing provided with a shoulder, said end plate including formed resilient arms, a retainer threaded into the housing acting against the resilient arms to urge said seat against said shoulder.

5. A pressure regulating valve according to claim 1 in which said means comprises a spring inside the bellows.

6. A pressure regulating valve according to claim 1 in which the mean effective area of the bellows is greater than the effective area of the valve orifice whereby a temperature and pressure drop inside the bellows causes a lesser drop in the valve closing force than would be the case if said effective areas were equal.

7. A pressure regulating valve according to claim 6 in which said means comprises a gas charge in the bellows.

8. A pressure regulating valve according to claim 6 in which said means comprises a spring.

9. A pressure regulating valve according to claim 1 in which the valve orifice and the valve are annular and the valve is supported by webs moving with the bellows, said webs allowing flow past the annular valve to the inside and outside of the valve.

* * * * *